US010956381B2

(12) United States Patent
Li et al.

(10) Patent No.: US 10,956,381 B2
(45) Date of Patent: Mar. 23, 2021

(54) DATA MIGRATION SYSTEM

(71) Applicant: ADP, LLC, Roseland, NJ (US)

(72) Inventors: Haifeng Li, Scarsdale, NY (US); Amit Maimon, New York, NY (US); Alain Brown, Brooklyn, NY (US); Hadar Yacobovitz, New York, NY (US); Jordan Schiffer, Brooklyn, NY (US)

(73) Assignee: ADP, LLC, Roseland, NJ (US)

( * ) Notice: Subject to any disclaimer, the term of this patent is extended or adjusted under 35 U.S.C. 154(b) by 337 days.

(21) Appl. No.: 14/541,463

(22) Filed: Nov. 14, 2014

(65) Prior Publication Data

US 2016/0140116 A1   May 19, 2016

(51) Int. Cl.
*G06F 16/21* (2019.01)
(52) U.S. Cl.
CPC ................... *G06F 16/214* (2019.01)
(58) Field of Classification Search
CPC ................... G06F 17/303; G06F 16/214
USPC .......................................................... 707/609
See application file for complete search history.

(56) References Cited

U.S. PATENT DOCUMENTS

| | | | |
|---|---|---|---|
| 5,819,254 A * | 10/1998 | Kawai | G06F 17/30595 |
| 6,029,195 A | 2/2000 | Herz | |
| 6,055,525 A | 4/2000 | Nusbickel | |
| 6,633,878 B1 | 10/2003 | Underwood | |
| 6,640,278 B1 | 10/2003 | Nolan et al. | |
| 7,117,163 B1 * | 10/2006 | Iyer | G06Q 30/02 |
| | | | 705/7.32 |
| 7,958,133 B2 | 6/2011 | Korn | |
| 8,140,408 B2 * | 3/2012 | Ashkenazi | H05K 7/2089 |
| | | | 705/27.1 |
| 8,156,063 B1 * | 4/2012 | Rahmouni | G06Q 10/06375 |
| | | | 706/45 |
| 8,676,937 B2 | 3/2014 | Rapaport et al. | |
| 9,436,712 B2 * | 9/2016 | Srinivasan | G06F 17/303 |
| 9,442,980 B1 * | 9/2016 | Trepetin | G06F 21/6254 |
| 2003/0126138 A1 * | 7/2003 | Walker | G06F 16/221 |

(Continued)

FOREIGN PATENT DOCUMENTS

EP   1717719 A1   11/2006
WO   2004077215 A2   9/2004

OTHER PUBLICATIONS

Rahm et al., "A survey of approaches to automatic schema matching," The VLDB Journal, vol. 10, copyright 2001, pp. 334-350.

*Primary Examiner* — Ashish Thomas
*Assistant Examiner* — Abdullah A Daud
(74) *Attorney, Agent, or Firm* — Yee & Associates, P.C.

(57) ABSTRACT

A method and apparatus for migrating data. A computer system locates information about a structure used to store the data in a source database. The computer system identifies similarities between first columns in the source database and second columns in a destination database based on column names and compatible data types in the information. The computer system also displays suggestions for matches between the first columns in the source database and the second columns in the destination database on a display system based on the similarities identified. Further, the computer system receives user input to the suggestions, enabling reaching a desired level of matching to migrate the data from the source database to the destination database.

20 Claims, 13 Drawing Sheets

(56) References Cited

U.S. PATENT DOCUMENTS

| | | | |
|---|---|---|---|
| 2004/0039681 A1* | 2/2004 | Cullen, III | G06Q 10/0639 705/37 |
| 2004/0143508 A1* | 7/2004 | Bohn | G06Q 30/02 705/26.1 |
| 2005/0027681 A1* | 2/2005 | Bernstein | G06F 16/86 |
| 2006/0026156 A1* | 2/2006 | Zuleba | G06F 21/6227 |
| 2006/0122035 A1* | 6/2006 | Felix | A63B 22/0023 482/8 |
| 2007/0185912 A1* | 8/2007 | Gupta | G06F 16/2462 |
| 2008/0114801 A1* | 5/2008 | Singh | G06F 16/217 |
| 2008/0208855 A1* | 8/2008 | Lingenfelder | G06F 16/258 |
| 2009/0106245 A1* | 4/2009 | Salcedo | G06F 16/27 |
| 2009/0222691 A1* | 9/2009 | Riemers | G06F 17/303 714/18 |
| 2010/0036759 A1* | 2/2010 | Ben-Yaacov | G06Q 30/06 705/30 |
| 2011/0191330 A1* | 8/2011 | Barve | G06F 16/00 707/723 |
| 2011/0258232 A1* | 10/2011 | Scriffignano | G06F 16/2462 707/780 |
| 2012/0095973 A1 | 4/2012 | Kehoe et al. | |
| 2012/0124081 A1* | 5/2012 | Ebrahimi | G06F 17/30569 707/769 |
| 2012/0265726 A1 | 10/2012 | Padmanabhan et al. | |
| 2013/0159353 A1* | 6/2013 | Fuh | G06F 21/6254 707/803 |
| 2013/0159960 A1* | 6/2013 | Sivaramakrishnan | G06F 8/33 717/100 |
| 2013/0173558 A1* | 7/2013 | Whisenant | G06F 11/0793 707/674 |
| 2014/0156652 A1* | 6/2014 | Abiola | G06Q 10/1053 707/723 |
| 2015/0019537 A1* | 1/2015 | Neels | G06F 16/26 707/722 |
| 2015/0046248 A1* | 2/2015 | Ben-Yaacov | G06Q 30/02 705/14.41 |
| 2015/0317366 A1* | 11/2015 | Gune | G06F 16/9535 707/722 |
| 2015/0379133 A1* | 12/2015 | Basovnik | G06F 17/30876 707/711 |
| 2016/0110662 A1* | 4/2016 | Dispoto | G06Q 10/06 705/7.27 |
| 2016/0140116 A1* | 5/2016 | Li | G06F 17/30424 707/609 |
| 2016/0140194 A1* | 5/2016 | Chang | G06F 17/303 709/203 |
| 2017/0091082 A1* | 3/2017 | Ooshima | G06F 11/3684 |
| 2017/0235625 A1* | 8/2017 | Ofer | G06F 11/0709 714/37 |
| 2018/0260472 A1* | 9/2018 | Kelsey | G06F 40/211 |

* cited by examiner

DATA MIGRATION SYSTEM

BACKGROUND INFORMATION

1. Field

The present disclosure relates generally to an improved computer system, and in particular, to a method and apparatus for migrating data in an employee information system. Still more particularly, the present disclosure relates to a method and apparatus for migrating data in an employee information system from a source database to a destination database.

2. Background

Employee information systems are used for many different purposes. For example, an employee information system may take the form of a payroll system used to process payroll to generate paychecks for employees in an organization. Additionally, an employee information system also may be used by a human resources department to maintain benefits and other records about employees. For example, a human resources department may manage health insurance, wellness plans, and other programs in an organization using an employee information system.

The data in an employee information system is typically stored in one or more databases. Some organizations run their own employee information systems. Other organizations obtain services from third parties that provide employee information systems. In either case, an organization may change from a first employee information system to a second employee information system at some point in time.

For example, a company may choose to use a new payroll service. For a large company, this change often involves moving the data from the current payroll service to the new payroll service.

Changing from the current payroll service to the new payroll service may involve migrating the data from the current payroll service to the new payroll service. The migration of the data includes moving the data from tables in a source database for the current payroll service to tables in a destination database in the new payroll service. In addition to moving the data, the migration may include changing the format of the data from the first format of a source database in the current payroll service to the second format of the destination database in the new payroll service to move the data to the destination database.

Currently, this process of migrating data from a source database to a destination database is a complex, tedious, and time-consuming process. For example, the source database may have 2000 or more tables. This data is migrated to tables in the destination database. The migration includes identifying which tables and which columns the tables in the destination database receive data from in the source database.

Currently, human operators match up columns between the source database and the destination database as part of the migration process. These matches are used to generate program code to move the data from the tables in the source database to the tables in the destination database. This part of the migration process is time-consuming and tedious. For example, the names of columns between tables in the databases are often different. Also, the types of data may be different. This process also may make migrating from one service to another service more costly than desired in addition to the time and effort involved in migrating the data.

Therefore, it would be desirable to have a method and apparatus that take into account at least some of the issues discussed above, as well as other possible issues. In particular, it would be desirable to have a method and apparatus that enable moving data from one database to another database more efficiently than with current techniques.

SUMMARY

In one illustrative embodiment, a method for migrating data is presented. A computer system locates information about a structure used to store the data in a source database. The computer system identifies similarities between first columns in the source database and second columns in a destination database based on column names and compatible data types in the information. The computer system also displays suggestions for matches between the first columns in the source database and the second columns in the destination database on a display system based on the similarities identified. Further, the computer system receives user input to the suggestions, enabling reaching a desired level of matching to migrate the data from the source database to the destination database.

In another illustrative embodiment, a computer system comprises a display system and a migrator in communication with the display system. The migrator locates information about a structure used to store data in a source database. The migrator also identifies similarities between first columns in the source database and second columns in a destination database based on column names and compatible data types in the information. Further, the migrator also displays suggestions for matches between the first columns in the source database and the second columns in the destination database on a display system based on the similarities identified. Still further, the migrator receives user input to the suggestions, enabling reaching a desired level of matching to migrate the data from the source database to the destination database.

In yet another illustrative embodiment, a computer program product for migrating data comprises a computer readable storage media, and a first program code, a second program code, a third program code, and a fourth program code stored on the computer readable storage media. The first program code locates information about a structure used to store the data in a source database. The second program code identifies similarities between first columns in the source database and second columns in the destination database based on columns name and compatible data types in the information. The third program code displays suggestions for matches between the first columns in the source database and the second columns in the destination database on a display system based on the similarities identified. The fourth program code receives user input to the suggestions, enabling reaching a desired level of matching to migrate the data from the source database to the destination database.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that schema matching techniques may be used in an attempt to match columns in tables in a source database and a destination database. The illustrative embodiments recognize and take into account that these techniques, however, may not provide a desired level of accuracy for migrating data from the source database to the destination database.

For example, the illustrative embodiments recognize and take into account that currently available schema matching techniques often result in false positives. The number of false positives is often large enough that the time and effort from human operators to check the matches between columns identified using a schema matching technique may be more than desired. As a result, the illustrative embodiments recognize and take into account that with currently used schema matching techniques, the amount of time and effort needed from a human operator may not be reduced as much as desired.

Thus, the illustrative embodiments provide a method and apparatus for migrating data. In one illustrative embodiment, a computer system locates information about a structure used to store the data in a source database. The computer system identifies similarities between first column names in the information in the source database and second column names in the information in the destination database based on compatible data types. The computer system displays suggestions for matches between the first columns in the source database and the second columns in the destination database on a display system based on the similarities identified. The computer system receives user input to the suggestions, enabling reaching a desired level of matching to migrate the data from the source database to the destination database. For example, the user input may be used to refine the suggestions for matches.

Figure 1:
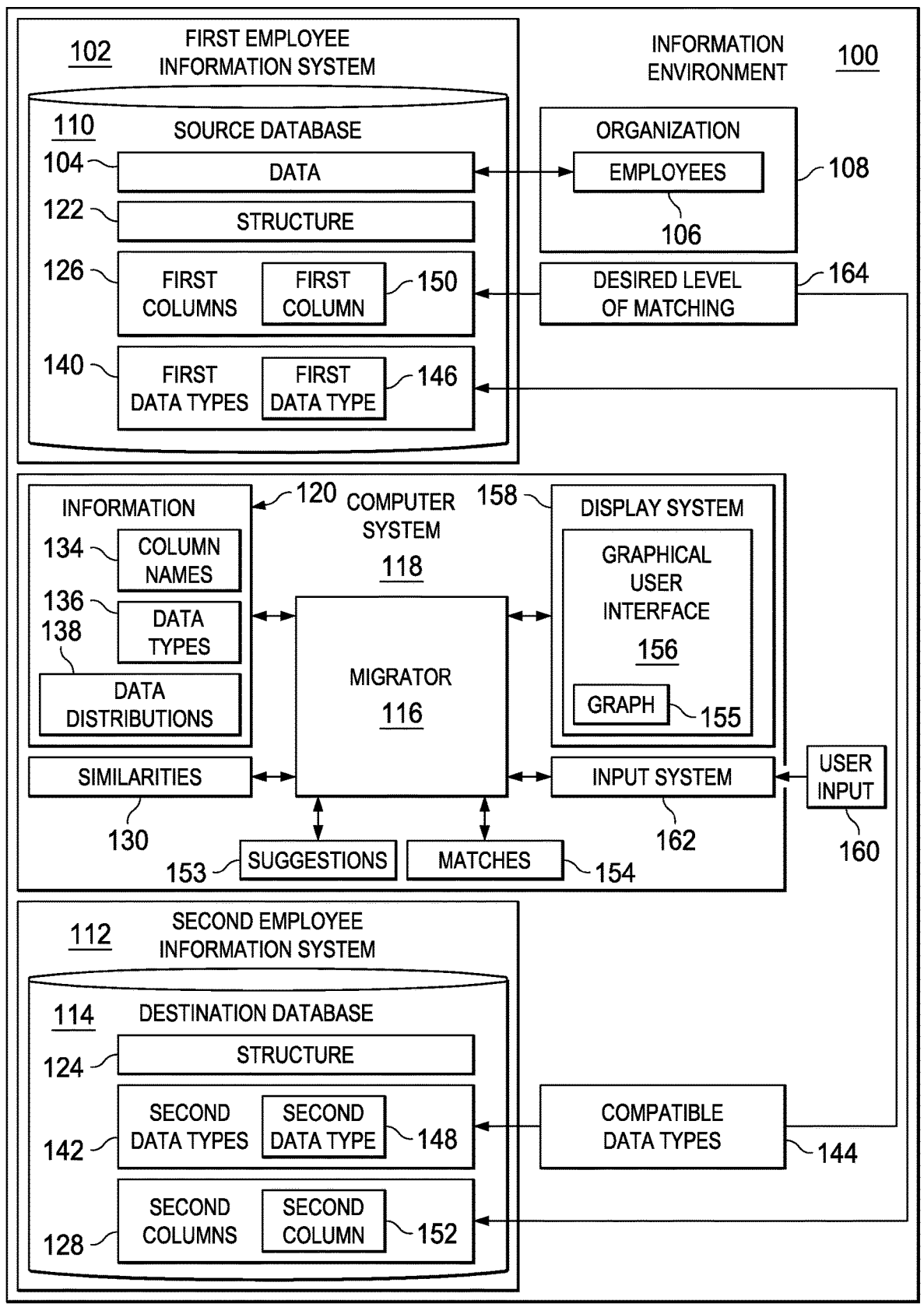
FIG. 1 is an illustration of a block diagram of an employee information environment in accordance with an illustrative embodiment.

With reference now to the figures, and in particular, with reference to FIG. 1, an illustration of a block diagram of an employee information environment is depicted in accordance with an illustrative embodiment. In this illustrative example, information environment 100 contains first employee information system 102. First employee information system 102 is used to access data 104 about employees 106 in organization 108. As depicted in this illustrative example, first employee information system 102 uses data 104 to perform operations such as generating paychecks, administering benefits, performing reviews, and other suitable operations.

Organization 108 may take various forms. For example, organization 108 may be a company, a charity, a partnership, a corporation, a government entity, or some other suitable organization that may employ people such as employees 106. The access may include adding, deleting, changing, or otherwise manipulating data 104.

In this illustrative example, data 104 is stored in source database 110 in first employee information system 102. Organization 108 may move data 104 from first employee information system 102 to second employee information system 112. As depicted, first employee information system 102 and second employee information system 112 may be operated by organization 108 or by another party offering services to organization 108. Second employee information system 112 may be an upgrade to first employee information system 102 or may provide services in place of or addition to the services provided by first employee information system 102. The services may include, for example, payroll, human resources functions, benefits administration, reviews, and other services.

The movement of data 104 from first employee information system 102 to second employee information system 112 includes moving data 104 from source database 110 in first employee information system 102 to destination database 114 in second employee information system 112. Source database 110 and destination database 114 are each an organized collection of data.

As depicted, migrator 116 moves data 104 from source database 110 to destination database 114. In the illustrative example, migrator 116 may be implemented in software, hardware, firmware or a combination thereof. When software is used, the operations performed by migrator 116 may be implemented in program code configured to run on hardware, such as a processor unit. When firmware is used, the operations performed by migrator 116 may be implemented in program code and data and stored in persistent memory to run on a processor unit. When hardware is employed, the hardware may include circuits that operate to perform the operations in migrator 116.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In the illustrative example, migrator 116 may be implemented in computer system 118. As depicted, computer system 118 is a hardware system that includes one or more data processing systems. When more than one data processing system is present, those data processing systems may be in communication with each other using a communications medium. The data communications medium may be a network. The data processing systems may be selected from at least one of a computer, a server computer, a work station, a laptop computer, a tablet computer, a mobile phone, or some other suitable type data processing system.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

During operation of migrator 116, migrator 116 locates information 120 about structure 122 used to store data 104 in source database 110. Information 120 about structure 122 is used to place data 104 into structure 124 for destination database 114.

Information 120 about structure 122 may include, for example, column names, data types, data distribution, and other suitable types of information. Structure 122 for source database 110 includes first columns 126. Structure 124 for destination database 114 includes second columns 128. In the illustrative example, information 120 about structure 122 for source database 110 may be a database schema. A database schema is a structure of a database in the illustrative example.

In the illustrative example, migrator 116 identifies similarities 130 between first columns 126 in source database 110 and second columns 128 in destination database 114.

Migrator 116 identifies similarities 130 based on column names 134. Migrator 116 may also identify similarities 130 based on data types 136 and data distributions 138.

For example, data types 136 are first data types 140 in first columns 126 in source database 110. Second data types 142 are present for second columns 128 in destination database 114. As depicted, migrator 116 may identify similarities 130 based on column names 134 and compatible data types 144 in information 120.

In the illustrative example, compatible data types 144 are first data types 140 in first columns 126 that are the same or sufficiently similar to second data types 142 in second columns 128 in destination database 114. As depicted, the similarity between first data type 146 in first data types 140 and second data type 148 in second data types 142 may be such that data 104 of first data type 146 in first column 150 in first columns 126 in source database 110 may be used in second column 152 in second columns 128 in destination database 114.

In this manner, similarities 130 may be used by migrator 116 to identify suggestions 153 for matches 154 between first columns 126 and second columns 128. In the illustrative example, migrator 116 displays suggestions 153 for matches 154 between first columns 126 in source database 110 and second columns 128 in destination database 114 in graphical user interface 156 on display system 158 in computer system 118 based on the similarities 130 identified. Display system 158 is one or more display devices. A display device may be selected from at least one of a light emitting diode (LED) display, a liquid crystal display (LCD), or some other suitable type of display device.

Migrator 116 receives user input 160 to suggestions 153 displayed in graphical user interface 156 on display system 158. User input 160 may be received through input system 162 in computer system 118. Input system 162 may be one or more user input devices. An input device may be selected from one of a keyboard, a mouse, a trackball, a touchscreen in display system 158, a joystick, or some other suitable type of input device.

User input 160 may be used by the migrator 116 to refine suggestions 153. In other words, migrator 116 may use user input 160 to change suggestions 153 in a manner that increases the accuracy of suggestions 153. For example, user input 160 may be used to repeat identifying similarities 130 between first columns 126 and second columns 128; displaying suggestions 153 for matches 154 in graphical user interface 156 on display system 158; and receiving user input 160 until desired level of matching 164 is present between first columns 126 and second columns 128 is present.

In this manner, migrator 116 enables reaching desired level of matching 164 to migrate data 104 from source database 110 to destination database 114. In the illustrative example, migrator 116 migrates data 104 from source database 110 to destination database 114 using desired level of matching 164 between first columns 126 and second columns 128.

As a result, computer system 118 operates as a special purpose computer system in which migrator 116 in computer system 118 enables identifying matches 154 between first columns 126 in source database 110 and second columns 128 in destination database 114 with desired level of matching 164. In particular, migrator 116 transforms computer system 118 into a special purpose computer system as compared to currently available general computer systems that do not have migrator 116.

Additionally, computer system 118 performs a transformation of data 104. In particular, computer system 118 changes the format of data 104 such that data 104 can be used in destination database 114 in addition to source database 110. In the illustrative examples, source database 110 and destination database 114 have different structures for storing data 104. These different structures may include the manner in which tables in the databases are organized. In particular, the different databases have different schemas requiring a transformation of data 104 from the format used by source database 110 into the format used by destination database 114.

The illustration of information environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the locating, identifying, displaying, and receiving steps described for migrator 116 may be performed for a group of databases in addition to source database 110. "A group of," as used herein with reference to items, means one or more items. For example, a group of databases is one or more databases. In particular, data from multiple databases may be migrated into destination database 114 in the depicted example.

As another example, migrator 116 may be located on a different computer apart from graphical user interface 156, display system 158 and input system 162. In one illustrative example, migrator 116 may be located on a server computer, while graphical user interface 156, display system 158, and input system 162 are located in a mobile phone or work station.

As still another illustrative example, migrator 116 may find suggestions 153 for matches 154 and display suggestions 153 in graph 155 in graphical user interface 156. The display of graph 155 is an example of a visualization of suggestions 153 that may be displayed in display system 158 to an operator or user of computer system 118.

For example, migrator 116 may find suggestions 153 for matches 154 based on a set of suggestions for matches that has a maximum weight and these suggestions may be displayed in first columns 126 and second columns 128 in graph 155 in graphical user interface 156. In this example, graph 155 may be a weighted bipartite graph. In this illustrative example, "a set of," when used with reference to items, means one or more items. For example, a set of suggestions for matches is one or more suggestions for matches. As used herein, a weight is a value given to a similarity in similarities 130, and the value changes with the importance of the similarity.

In this example, the bipartite graph is a graph of similarities 130 between first columns 126 and second columns 128. As used herein, a bipartite graph is a graph that shows similarities between two sets of columns. In this illustrative example, sets of suggestions for matches for the bipartite graph include all the possible combinations of sets of suggestions for matches in which columns from first columns 126 have only one suggested match to columns in second columns 128.

Figure 2:
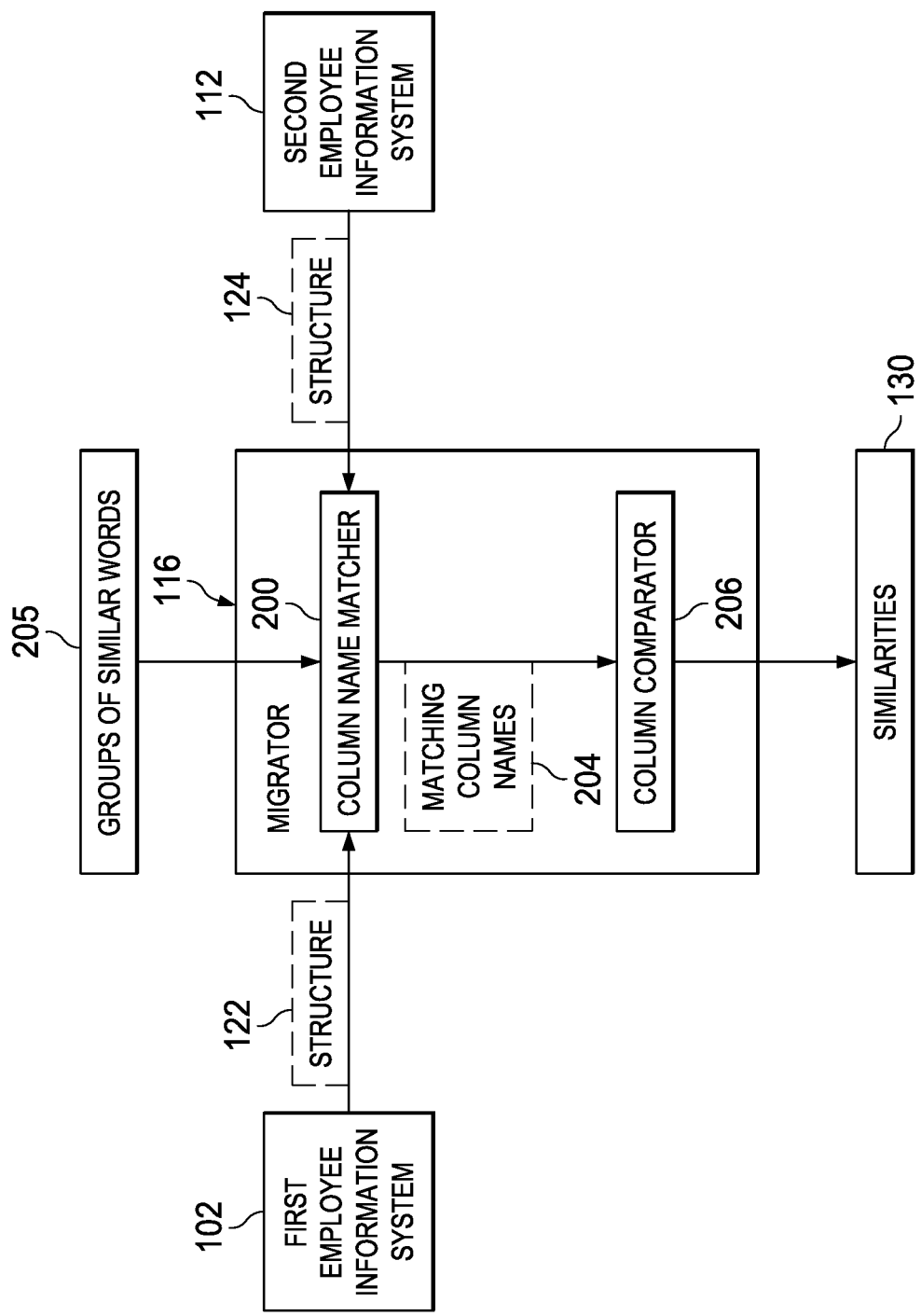
FIG. 2 is an illustration of a block diagram of a migrator in accordance with an illustrative embodiment.
Figure 3:
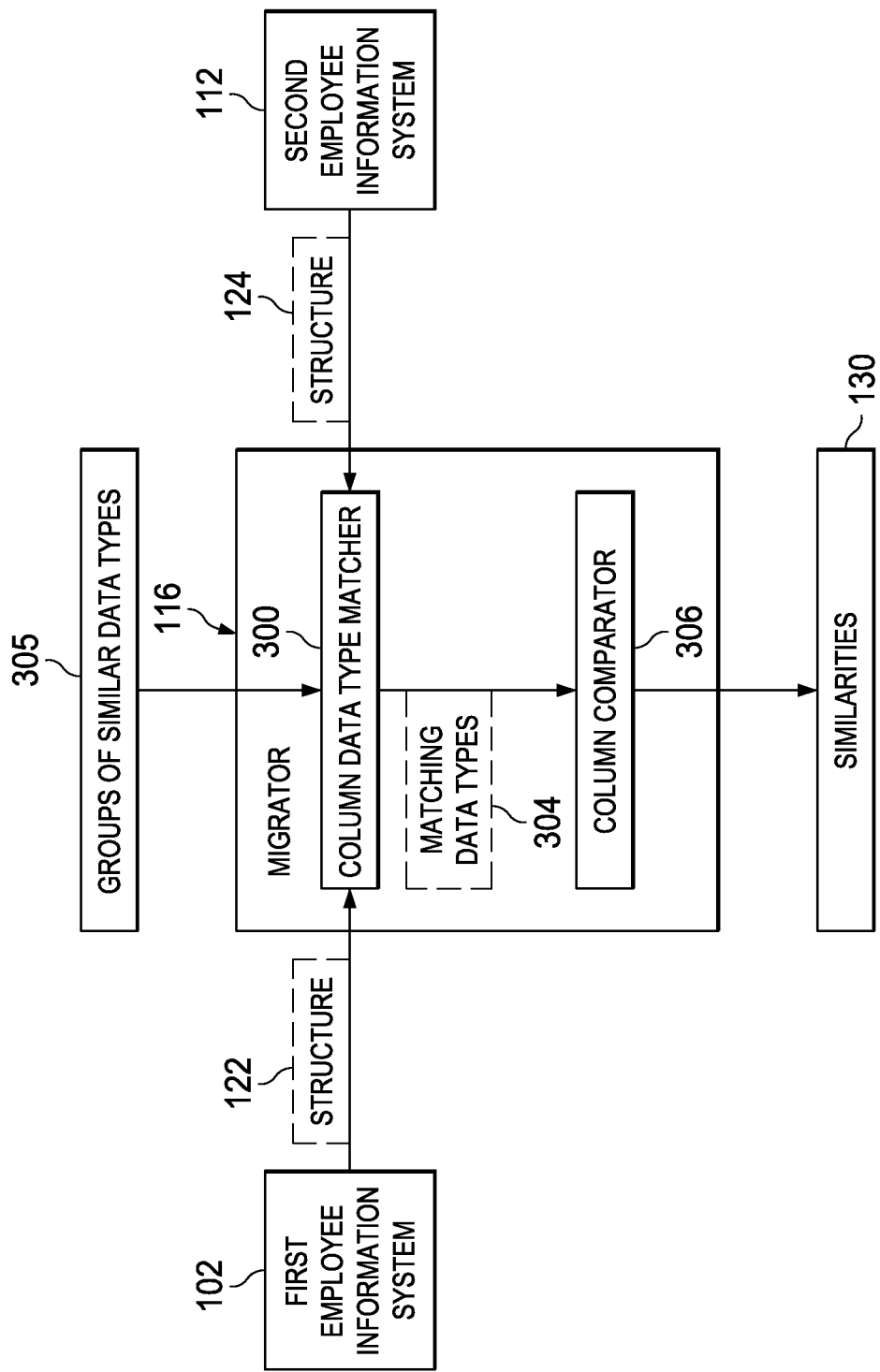
FIG. 3 is an illustration of a block diagram of a migrator in accordance with an illustrative embodiment.
Figure 4:
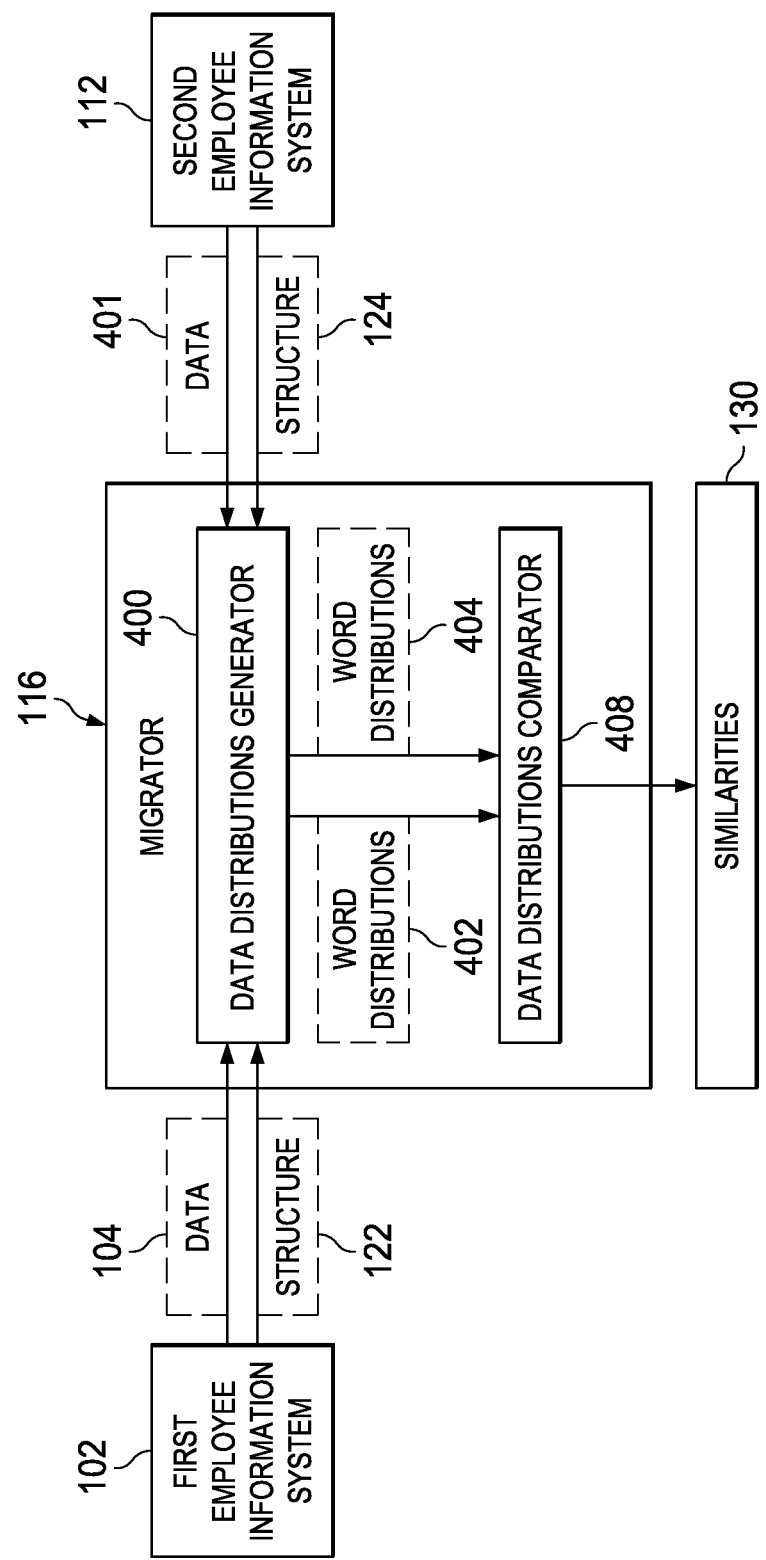
FIG. 4 is an illustration of a block diagram of a migrator in accordance with an illustrative embodiment.

In this depicted example, weights for the sets of suggestions for matches are calculated as a sum of similarities for the suggested matches in the sets of suggestions. A similarity is how much two items are alike while they may not be identical. In this example, the items may be two columns. As used herein, a similarity between two columns is an indication of a shared relationship between the columns in which information stored in one of the columns may be exchanged with the other of the columns. In this illustrative example, the shared relationship for the similarity between two columns is at least one of similar column names, similar data types, or similar data distributions. FIG. 2, FIG. 3, and FIG. 4, below, describe in more detail how the similarities are identified.

Further in this illustrative example, the set of suggestions with the largest sum is the set with the maximum weight in the weighted bipartite graph. In this example, suggestions 153 for matches 154 are set to the set of suggestions with the maximum weight in the weighted bipartite graph.

In this illustrative example, a number of existing algorithms may be used to efficiently identify the set of suggestions for matches for the bipartite graph that has the maximum weight in the bipartite graph. For example, an algorithm known as the "Kuhn-Munkres algorithm" may be used to identify suggestions 153 for matches 154 from the bipartite graph of similarities 130 between first columns 126 and second columns 128.

With reference next to FIG. 2, an illustration of a block diagram of a migrator is depicted in accordance with an illustrative embodiment. In this figure, examples of components for migrator 116 in FIG. 1 are depicted for determining similarities between columns based on column names. In the illustrative examples, the same reference numeral may be used in more than one figure. This reuse of a reference numeral in different figures represents the same element in the different figures.

In this illustrative example, migrator 116 includes column name matcher 200. As depicted, column name matcher 200 receives structure 122 from first employee information system 102. Column name matcher 200 also receives structure 124 from second employee information system 112. Column name matcher 200 identifies first column names in structure 122 and second column names in structure 124.

As depicted, column name matcher 200 identifies matching column names 204 based on words in the first column names that match words in the second column names. In this illustrative example, a first column name matches a second column name when at least one of a group of the words or all of the words in the first column name matches at least one of a group of the words or all of the words in the second column name.

In this illustrative example, column name matcher 200 may also use groups of similar words 205 to identify matching column names 204 between first column names in structure 122 and second column names in structure 124. A group of similar words in groups of similar words 205 is at least one of synonyms, spelling variations, abbreviations, syllables, phrases, translations to other languages, or other suitable types of variations of written text that represent words having a same or similar meaning. In this illustrative example, a first column name matches a second column name when a first portion of the words in the first column name and a second portion of the words in the second column match based on a group of words in groups of similar words 205. In the illustrative example, user input may be received to modify a group of similar words in the groups of similar words.

As depicted, migrator 116 also includes column comparator 206. In this illustrative example, column comparator 206 receives matching column names 204 from column name matcher 200. Column comparator 206 then selects the best matches in matching column names 204 as similarities 130. In this illustrative example, the best match is a match selected from a group of matches that has the highest number of matching words in the group of matches. In the depicted example, when none of the matches in the group of matches is based on matching words, the best match is the match with the highest number of similar words.

For example, column comparator 206 may select exact matches between column names as similarities 130 for columns before selecting matches based on column names having similar words. As another example, column comparator 206 may select matches between column names that have the most number of words matching as similarities 130. As still another example, column comparator 206 may select matches between column names based on at least one of spelling variations, abbreviations, translations to other languages, or selected matches based on synonyms. In this fashion, column comparator 206 selects the best matches in matching column names 204 as similarities 130.

Turning to FIG. 3, an illustration of a block diagram of a migrator is depicted in accordance with an illustrative embodiment. In this figure, examples of components for migrator 116 in FIG. 1 are depicted for determining similarities between columns based on data types. The data types compared in FIG. 3 are examples of data types 136 and first data types 140 in FIG. 1. For example, the data types may be selected from at least one of a string, a text, a phone number, a float, an integer, currency, or other suitable data types.

In this illustrative example, migrator 116 includes column data type matcher 300. As depicted, column data type matcher 300 receives structure 122 from first employee information system 102 and structure 124 from second employee information system 112. Column data type matcher 300 identifies first data types for first columns in structure 122 and second data types for second columns in structure 124.

As depicted, column data type matcher 300 identifies matching data types 304 based on matches between first data types and second data types. In this illustrative example, a first data type matches a second data type when at least one of a portion of words or all of the words specifying the first data type matches at least one of a portion of words or all of the words specifying the second data type.

In this illustrative example, column data type matcher 300 may also use groups of similar data types 305 to identify matching data types 304 between the first data types in structure 122 and the second data types in structure 124. A group of similar data types in groups of similar data types 305 is a group of two or more data types having a same or similar specification.

In the illustrative example, a first data type is similar to a second data type when the information stored in the first data type can be migrated to the second data type without losing detail. Losing detail means a portion of the information stored in the first data type is not present in the information when it is migrated to the second data type. For example, a phone number stored using a phone number data type can be migrated to a text or string data type without losing detail. As another example, if the first data type is currency and the second data type is an integer, then the data types are said to be incompatible because information would be lost in migration. In this illustrative example, the portion of currency known as cents would be lost because an integer does not have decimal places. In this illustrative example, a first data type matches a second data type when the first data type and the second data type are both located in at least one group in groups of similar data types 305.

As depicted, migrator 116 also includes column comparator 306. In this illustrative example, column comparator 306 receives matching data types 304 from column data type matcher 300. Column comparator 306 then selects the best matches in matching data types 304 as similarities 130.

For example, column comparator 306 may select exact matches between data types as similarities 130 for columns before selecting matches based on data types being in a group of similar data types. In this fashion, column comparator 306 selects the best matches in matching data types 304 as similarities 130.

Turning now to FIG. 4, an illustration of a block diagram of a migrator is depicted in accordance with an illustrative embodiment. In this figure, examples of components for migrator 116 in FIG. 1 are depicted for determining similarities between columns based on data distributions.

In this illustrative example, migrator 116 includes data distributions generator 400. As depicted, data distributions generator 400 receives data 104 and structure 122 from first employee information system 102. Data distributions generator 400 also receives data 401 and structure 124 from second employee information system 112. Data distributions generator 400 identifies first columns in data 104 for first columns in structure 122 and second columns in data 401 based on second columns in structure 124. Data 401 is data previously stored in second employee information system 112. Data 401 may include data that was previously migrated to second employee information system 112 from an employee information system other than first employee information system 102. Data 401 may be data that is entered directly into second employee information system 112.

As depicted, data distributions generator 400 generates word distributions 402 for first columns in data 104. Data distributions generator 400 generates word distributions 404 for second columns in data 401. Word distributions are the number of times particular words show up in data. For example, 50 percent of the words in a first column in data 104 may be the word "male" and the other 50 percent may be the word "female." In this illustrative example, data distributions generator 400 generates word distributions 402 by identifying counts for the number of times each word is present in data for each of the columns.

In this illustrative example, migrator 116 also includes data distributions comparator 408. In this illustrative example, data distributions comparator 408 receives word distributions 402 and word distributions 404 from data distributions generator 400. As depicted, data distributions comparator 408 compares word distributions 402 with word distributions 404 to identify first columns in data 104 and second columns in data 401 having at least one of a same or a similar distribution of words. Data distributions comparator 408 then selects the best matches between word distributions for columns as similarities 130.

For example, data distributions comparator 408 may select a first column in data 104 and a second column in data 401 as a similarity in similarities 130. In this example, data distributions comparator 408 identifies the similarity between the first column and the second column based on identifying that 50 percent of the words in the first column and second column are the word "male" and the other 50 percent are the word "female."

Figure 5:
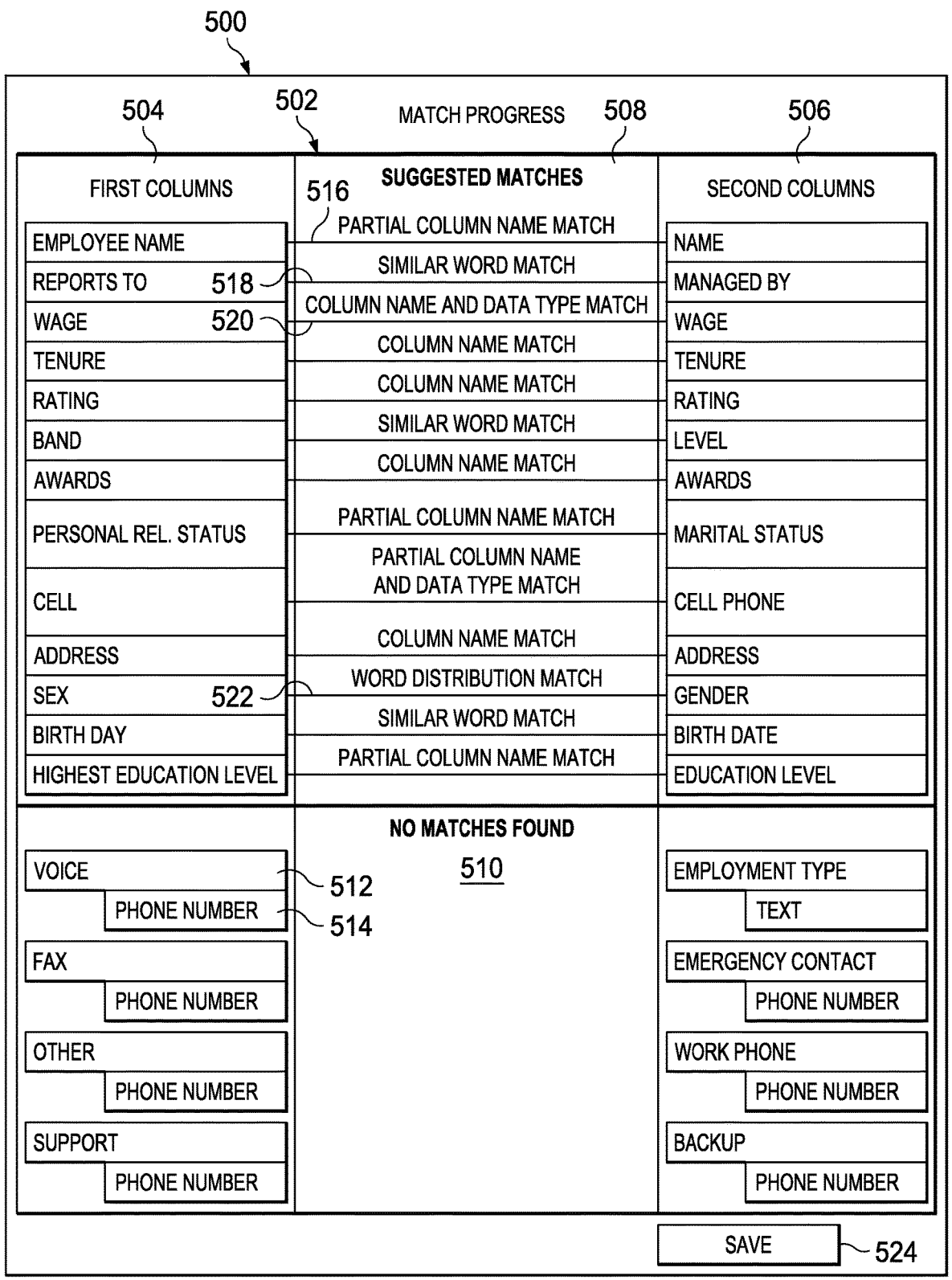
FIG. 5 is an illustration of a graphical user interface displaying suggested matches between columns in accordance with an illustrative embodiment.

Turning now to FIG. 5, an illustration of a graphical user interface displaying suggested matches between columns is depicted in accordance with an illustrative embodiment. In this illustrative example, graphical user interface 500 is an example of an implementation for graphical user interface 156 shown in block form in FIG. 1.

In this illustrative example, graphical user interface 500 displays table 502. As depicted, the columns in table 502 include first columns 504, second columns 506, suggested matches 508, and no matches found 510. In the illustrative example, the rows in table 502 for first columns 504 and second columns 506 include a visualization of at least one of column names 512 or data types 514.

In this illustrative example, table 502 may be a bipartite graph for first columns 504 and second columns 506. In particular, table 502 with first columns 504, second columns 506, suggested matches 508, and no matches found 510 may be an example of graph 155 shown in block form in FIG. 1.

As depicted, the rows in suggested matches 508 are visualizations of suggestions 153 in FIG. 1. In this illustrative example, suggested matches 508 include information about suggested matches 508. As depicted, the information about suggested matches is at least one of matching column names, matching data types, or matching data distributions.

In this illustrative example, suggested match 516 in suggested matches 508 shows "employee name" in first columns 504 as matching "name" in second columns 506. The information about suggested match 516 is visualized as a line connecting "employee name" to "name" with the text description "partial column name match." In other words, suggested match 516 shows "employee name" in first columns 504 is a partial column name match for "name" in second columns 506. A partial column name match means at least one of a group of words in a first column name matches at least one of a group of words in a second column name.

As depicted, suggested match 518 in suggested matches 508 shows "reports to" in first columns 504 as matching "managed by" in second columns 506. The information about suggested match 518 is visualized as a line connecting "reports to" to "managed by" with the text description "similar word match." In other words, suggested match 518 shows "reports to" in first columns 504 is a similar word match for "managed by" in second columns 506. A similar word match between "reports to" and "managed by" means a group of words in "reports to" and a group of words in "managed by" are located in a group of words in groups of similar words 205 in FIG. 2.

In this illustrative example, suggested match 520 in suggested matches 508 shows "wage" in first columns 504 as matching "wage" in second columns 506. The information about suggested match 516 is visualized as a line connecting "wage" to "wage" with the text description "column name and data type match." In other words, suggested match 520 shows "wage" in first columns 504 is a column name match and data type match for "wage" in second columns 506. A column name match means all of the words in the first column name match all of the words in the second column name. A data type match for columns means the data type for the columns is at least one of the same data type or a compatible data type.

As depicted, suggested match 522 in suggested matches 508 shows "sex" in first columns 504 as matching "gender" in second columns 506. The information about suggested match 522 is visualized as a line connecting "sex" to "gender" with the text description "word distribution match." In other words, suggested match 522 shows "sex" in first columns 504 is a word distribution match for "gender" in second columns 506. A word distribution match between "sex" and "gender" means a first column named "sex" in data 104 has a word distribution that matches a word distribution for a second column named "gender" in data 401 in FIG. 4. For example, the matching between the first column named "sex" and the second column named "gender" may be based on a determination that 50 percent of the words in the first and second column are the word "male" and the other 50 percent are the word "female."

In this illustrative example, the rows in table 502 for no matches found 510 is a depiction of the absence of suggestions for matches between a portion of first columns 504 and a portion of second columns 506. As depicted, when no matches are found for rows of columns in first columns 504 or second columns 506, the rows in table 502 for first columns 504 and second columns 506 may include a visualization of both column names 512 and data types 514.

As depicted, selecting save button 524 in graphical user interface 500 saves table 502 for later use. Other buttons may also be located in graphical user interface 500. For example, graphical user interface 500 may also include buttons for at least one of selecting first columns 504, selecting second columns 506, validating suggested matches 508, invalidating portions of suggested matches 508, displaying additional information for selected matches, displaying additional information for a selected column in one of first columns 504 or second columns 506, and other buttons for other suitable actions for graphical user interface 500.

Figure 6:
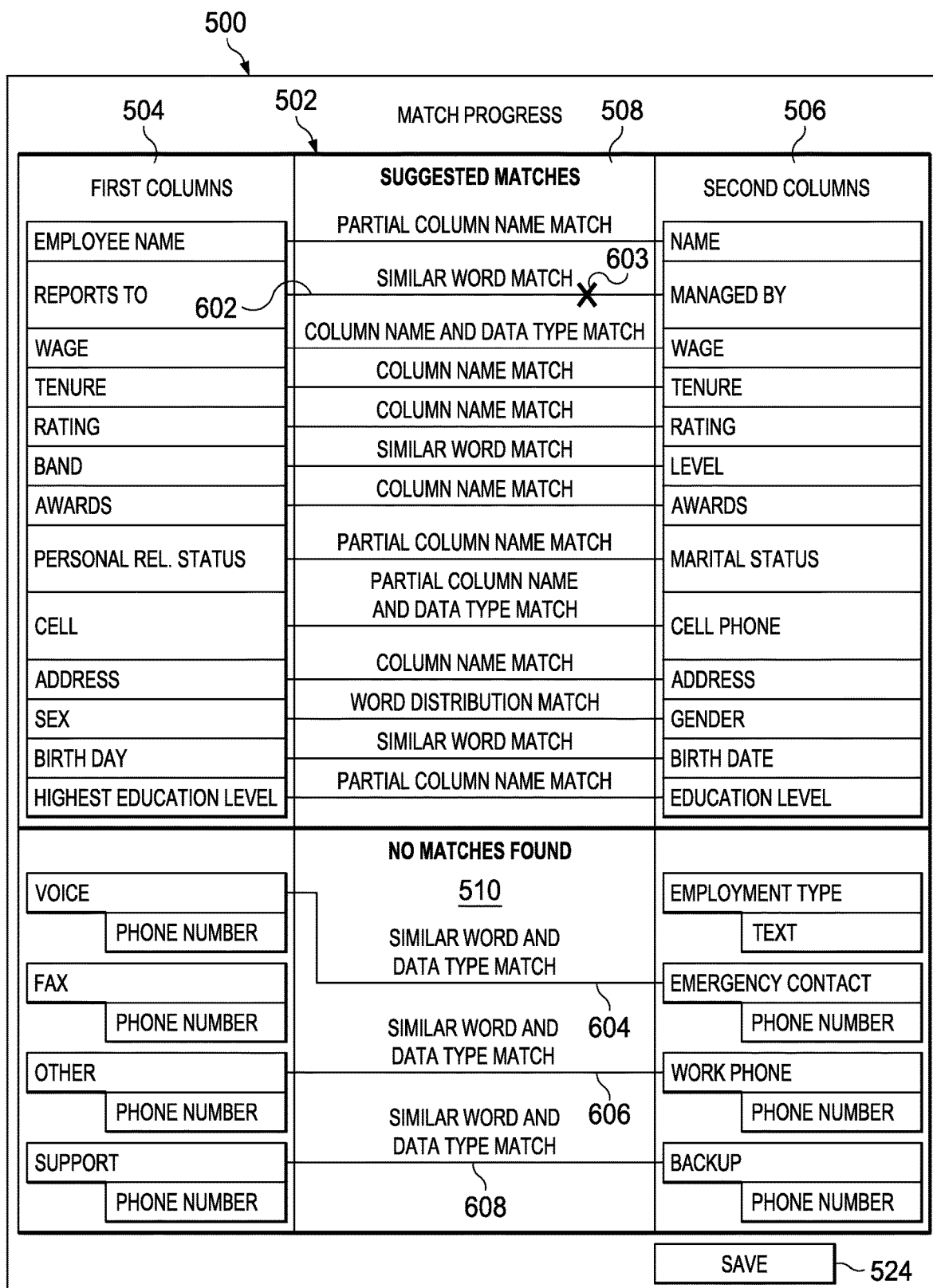
FIG. 6 is an illustration of a graphical user interface for managing suggested matches between columns in accordance with an illustrative embodiment.

Turning next to FIG. 6, an illustration of a graphical user interface for managing suggested matches between columns is depicted in accordance with an illustrative embodiment. In this illustrative example, changes to suggested matches between first columns 504 and second columns 506 are shown in this figure.

As depicted, user input has been received in graphical user interface 500 for removing suggested match 602. In this illustrative example, removing suggested match 602 specifies that the "reports to" column name should not be used as a similar word match for the "managed by" column name. In this illustrative example, graphical indicator 603 is displayed indicating suggested match 602 has been removed. As depicted in this illustrative example, graphical indicator 603 is an "X". As another example, instead of showing the "X" over suggested match 602, suggested match 602 may be removed from the display of suggested matches in suggested matches 508.

In this illustrative example, user input has been received adding suggested match 604, suggested match 606, and suggested match 608. As depicted, the user input for suggested match 604 has specified that "voice" is a similar word match for "emergency contact." The user input for suggested match 604 has also specified that the phone number data type in first columns 504 is a data type match for the phone number data type in second columns 506.

As also depicted, the user input for suggested match 606 has specified that "other" is a similar word match for "work phone." The user input for suggested match 606 has also specified that suggested match 606 is based on the match between the phone number data type in first columns 504 and the phone number data type in second columns 506.

As further depicted, the user input for suggested match 608 has specified that "support" is a similar word match for "backup." The user input for suggested match 608 has also specified that suggested match 608 is based on the match between the phone number data type in first columns 504 and the phone number data type in second columns 506. In this illustrative example, selecting save button 524 in graphical user interface 500 saves the changes made to suggested matches between first columns 504 and second columns 506 in table 502 for later use.

Figure 7:
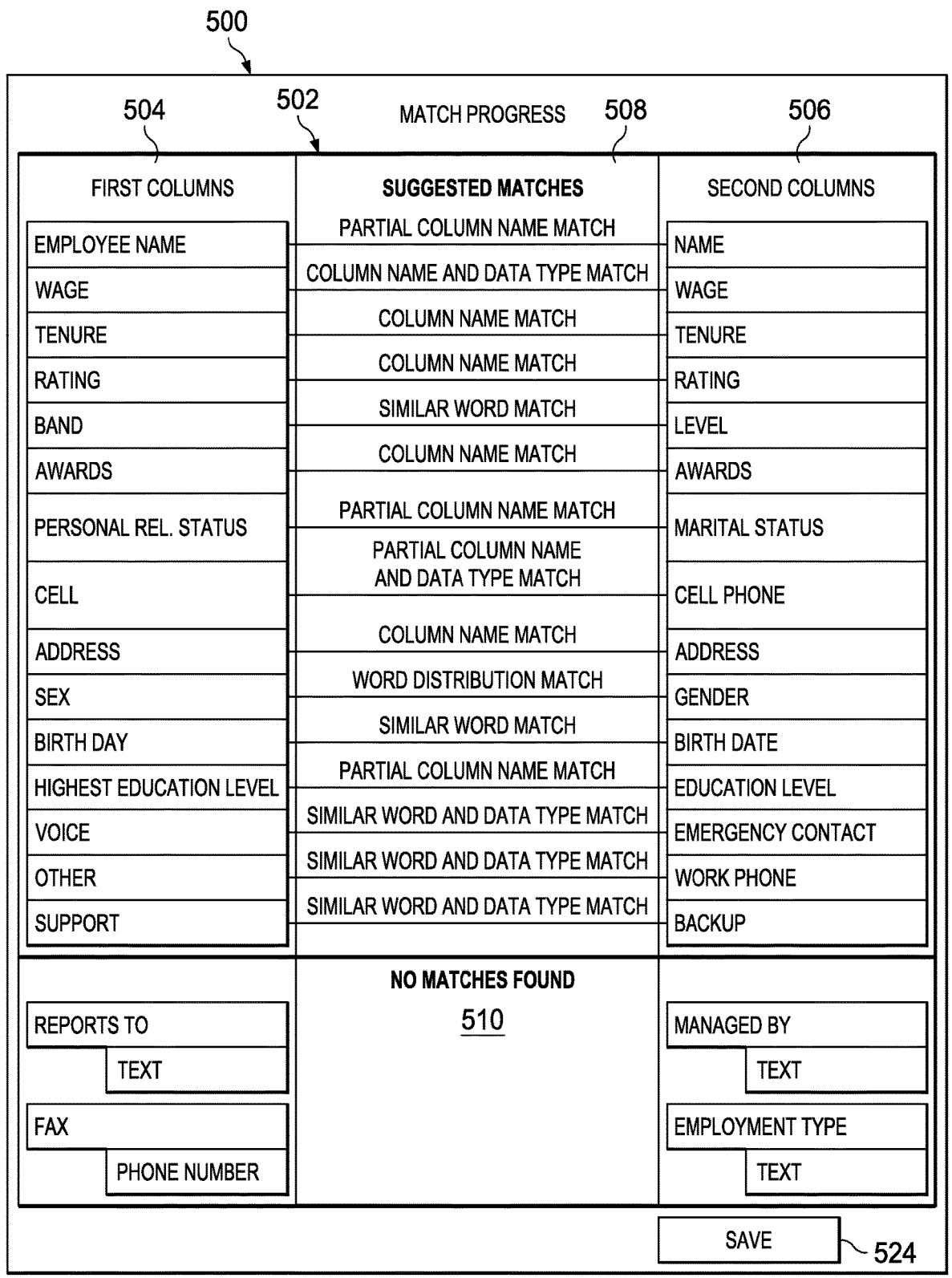
FIG. 7 is an illustration of a graphical user interface for displaying suggested matches between columns in accordance with an illustrative embodiment.

With reference now to FIG. 7, an illustration of a graphical user interface for displaying suggested matches between columns is depicted in accordance with an illustrative embodiment. In this illustrative example, changes made in FIG. 6 to suggested matches between first columns 504 and second columns 506 have been saved.

As depicted, the rows in suggested matches 508 are visualizations of suggestions 153 in FIG. 1 that reflect the changes made in FIG. 6 to the suggested matches between first columns 504 and second columns 506. As also depicted, the removal of the suggested match between "reports to" in first columns 504 and "managed by" in second columns 506 is displayed as "reports to" and "managed by" being displayed as rows in no matches found 510.

Figure 8:
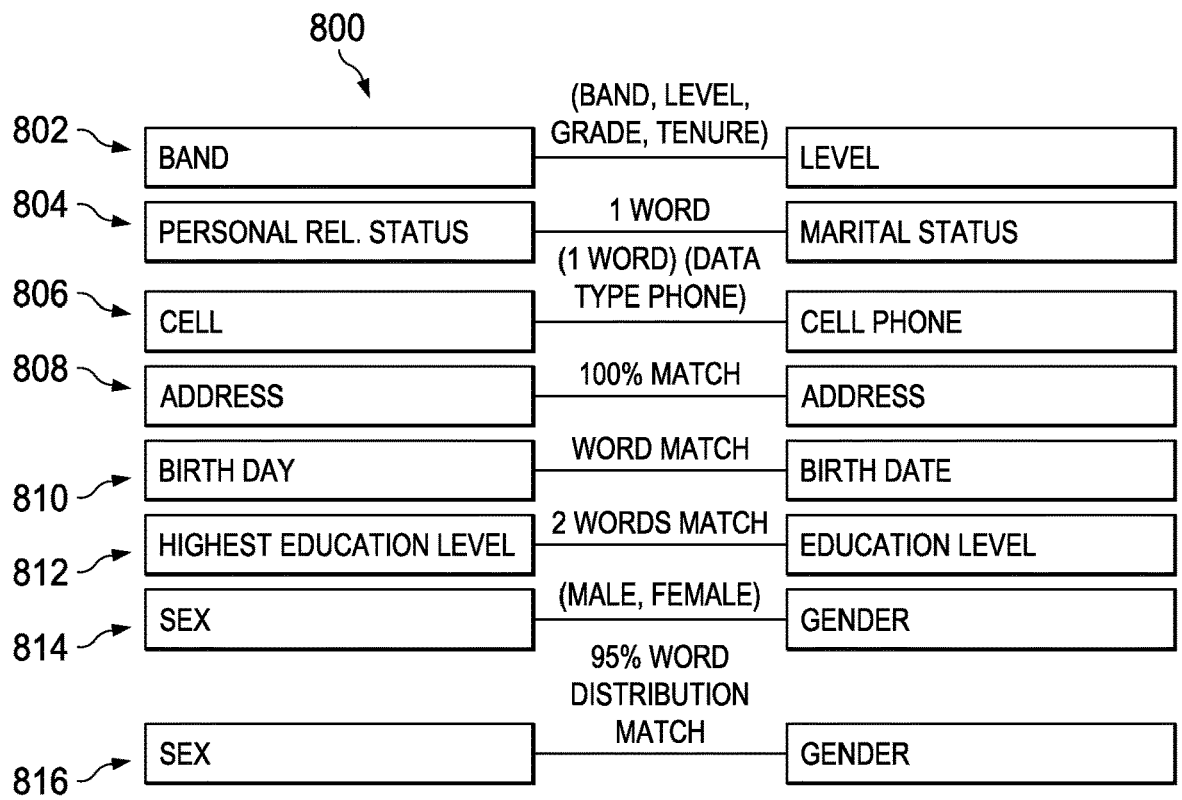
FIG. 8 is an illustration of examples of visualizations for displaying suggested matches between columns in accordance with an illustrative embodiment.

With reference now to FIG. 8, an illustration of examples of visualizations for displaying suggested matches between columns is depicted in accordance with an illustrative embodiment. As depicted, suggested matches 800 are examples of suggested matches in suggested matches 508 in FIG. 5, FIG. 6, and FIG. 7.

In this illustrative example, suggested match 802 is between first column name "band" and second column name "level." As depicted, information for suggested match 802 is visualized for suggested match 802. In this illustrative example, the information visualized in suggested match 802 includes a group of similar words in which first column "band" and second column "level" are matched. As depicted, this group of similar words includes band, level, grade, and tenure.

In this illustrative example, suggested match 804 is between first column name "personal rel. status" and second column name "marital status." In this illustrative example, the information visualized in suggested match 804 includes the number of words matching between first column name "personal rel. status" and second column name "marital status."

As depicted, suggested match 806 is between first column name "cell" and second column name "cell phone." In this illustrative example, the information visualized in suggested match 806 includes the number of words matching between the columns and the matching data type "phone."

In this illustrative example, suggested match 808 is between first column name "address" and second column name "address." As depicted, the information visualized in suggested match 808 includes an identification that there is a 100 percent match between the column names.

In the illustrative example, suggested match 810 is between first column name "birth day" and second column name "birth date." In this illustrative example, the information visualized in suggested match 810 includes an identification that there is a word match between the column names.

As depicted, suggested match 812 is between first column name "highest education level" and second column name "education level." In this illustrative example, the information visualized in suggested match 812 includes the number of words matching between the column names.

In this illustrative example, suggested match 814 is between first column name "sex" and second column name "gender." As depicted, the information visualized in suggested match 814 includes a group of words of a match between data distributions for the columns. In this illustrative example, the group of words matching in the data distribution for the columns include male and female. In other words, the first column "sex" is a suggested match for the second column "gender" because the words male and female were stored in data for the columns with similar distributions.

As depicted, suggested match 816 is between first column name "sex" and second column name "gender." In this illustrative example, the information visualized in suggested match 816 includes a percentage representing the amount of word distribution match between word distribution for data for the first column and word distribution for data for the second column.

Figure 9:
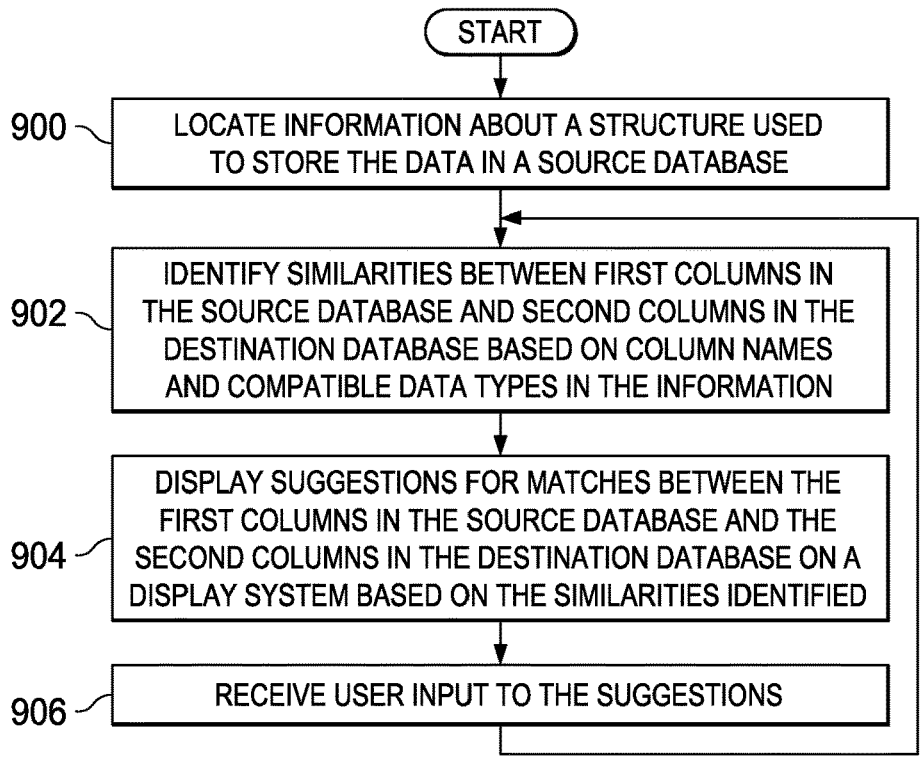
FIG. 9 is an illustration of a high level flowchart of a process for migrating data in accordance with an illustrative embodiment.

Turning next to FIG. 9, an illustration of a high level flowchart of a process for migrating data is depicted in accordance with an illustrative embodiment. The process illustrated in FIG. 9 may be implemented in information environment 100 in FIG. 1. The process may be implemented in migrator 116 in FIG. 1 to migrate data 104 from first employee information system 102 to second employee information system 112.

The process begins by locating information about a structure used to store the data in a source database (step 900). The process then identifies similarities between first columns in the source database and second columns in the destination database based on column names and compatible data types in the information (step 902). The process displays suggestions for matches between the first columns in the source database and the second columns in the destination database on a display system based on the similarities identified (step 904).

The process receives user input to the suggestions (step 906) with the process returning to step 902. The process may continue until a desired level of matching between the first columns and second columns is present. In this manner, the process enables reaching a desired level of matching to migrate the data from the source database to the destination database.

Figure 10:
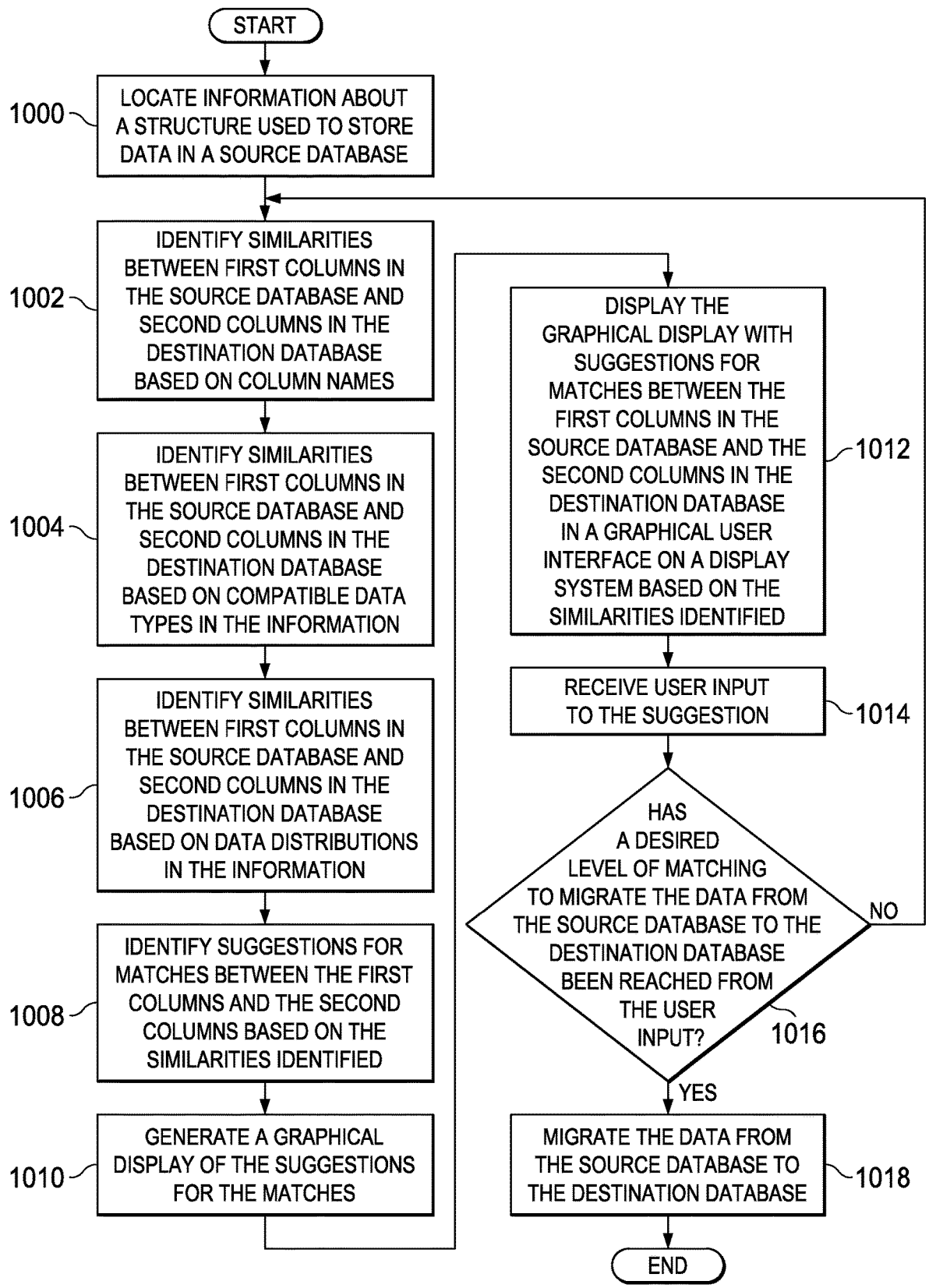
FIG. 10 is an illustration of a flowchart of a process for migrating data in accordance with an illustrative embodiment.

Turning next to FIG. 10, an illustration of a flowchart of a process for migrating data is depicted in accordance with an illustrative embodiment. The process illustrated in FIG. 10 may be implemented in information environment 100 in FIG. 1. The process may be implemented in migrator 116 in FIG. 1 to migrate data 104 from first employee information system 102 to second employee information system 112.

The process begins by locating information about a structure used to store the data in a source database (step 1000). The process then identifies similarities between first columns in the source database and second columns in the destination database based on column names (step 1002).

The process identifies similarities between first columns in the source database and second columns in the destination database based on compatible data types in the information (step 1004). In step 1004, a compatible data type is a data type for a first column in the source database that is the same as a data type in a second column in the destination database. A compatible data type may also be a data type for a first column in the source database that is similar enough to a data type in a second column in the destination database such that the data in the first column in the source database may be used in the second column in the destination database.

The process identifies similarities between first columns in the source database and second columns in the destination database based on data distributions in the information (step 1006). The similarities identified based on data distributions may be performed using currently available statistical techniques.

The process identifies suggestions for matches between the first columns and the second columns based on the similarities identified (step 1008). The process then generates a graphical display of the suggestions for the matches (step 1010).

The process displays the graphical display with suggestions for matches between the first columns in the source database and the second columns in the destination database in a graphical user interface on a display system based on the similarities identified (step 1012). The process receives user input to the suggestions (step 1014).

A determination is made as to whether a desired level of matching to migrate the data from the source database to the destination database has been reached from the user input (step 1016). If a desired level of matching has not been reached, the process returns to step 1002. In this case, the user input includes input on the similarities between the first columns and the second columns. This user input is used in at least one of step 1002, step 1004, and step 1006 to further refine the identification of similarities.

With reference again to step 1016, if the desired level of matching has been reached, the process migrates the data from the source database to the destination database (step 1018) with the process terminating thereafter. Step 1018 may include generating program code using the desired level of matching to move the data from tables in the source database to tables in the destination database.

Figure 11:
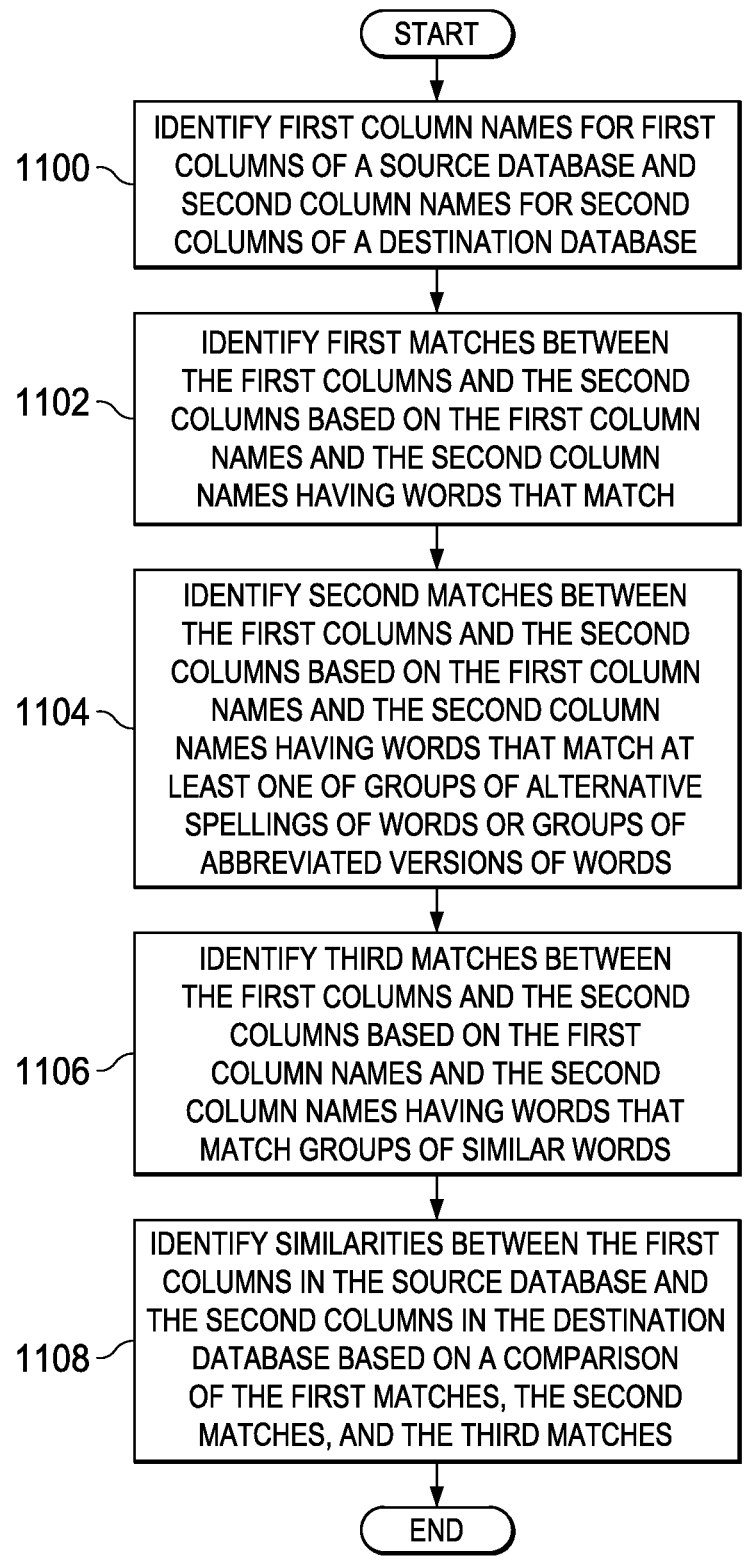
FIG. 11 is an illustration of a high level flowchart of a process for identifying similarities between columns based on column names in accordance with an illustrative embodiment.

With reference now to FIG. 11, an illustration of a high level flowchart of a process for identifying similarities between columns based on column names is depicted in accordance with an illustrative embodiment. The process illustrated in FIG. 11 is an example of an implementation of step 1002 in FIG. 10. The process may be implemented in information environment 100 in FIG. 1. More particularly, the process may be implemented in migrator 116 in FIG. 1 to migrate data 104 from first employee information system 102 to second employee information system 112.

The process begins by identifying first column names for first columns of a source database and second column names for second columns of a destination database (step 1100). The process identifies first matches between the first columns and the second columns based on the first column names and the second column names having words that match (step 1102). The process also identifies second matches between the first columns and the second columns based on the first column names and the second column names having words that match at least one of groups of alternative spellings of words or groups of abbreviated versions of words (step 1104).

As depicted, the process further identifies third matches between the first columns and the second columns based on the first column names and the second column names having words that match groups of similar words (step 1106). The process then identifies similarities between the first columns in the source database and the second columns in the destination database based on a comparison of the first matches, the second matches, and the third matches (step 1108) with the process terminating thereafter.

Figure 12:
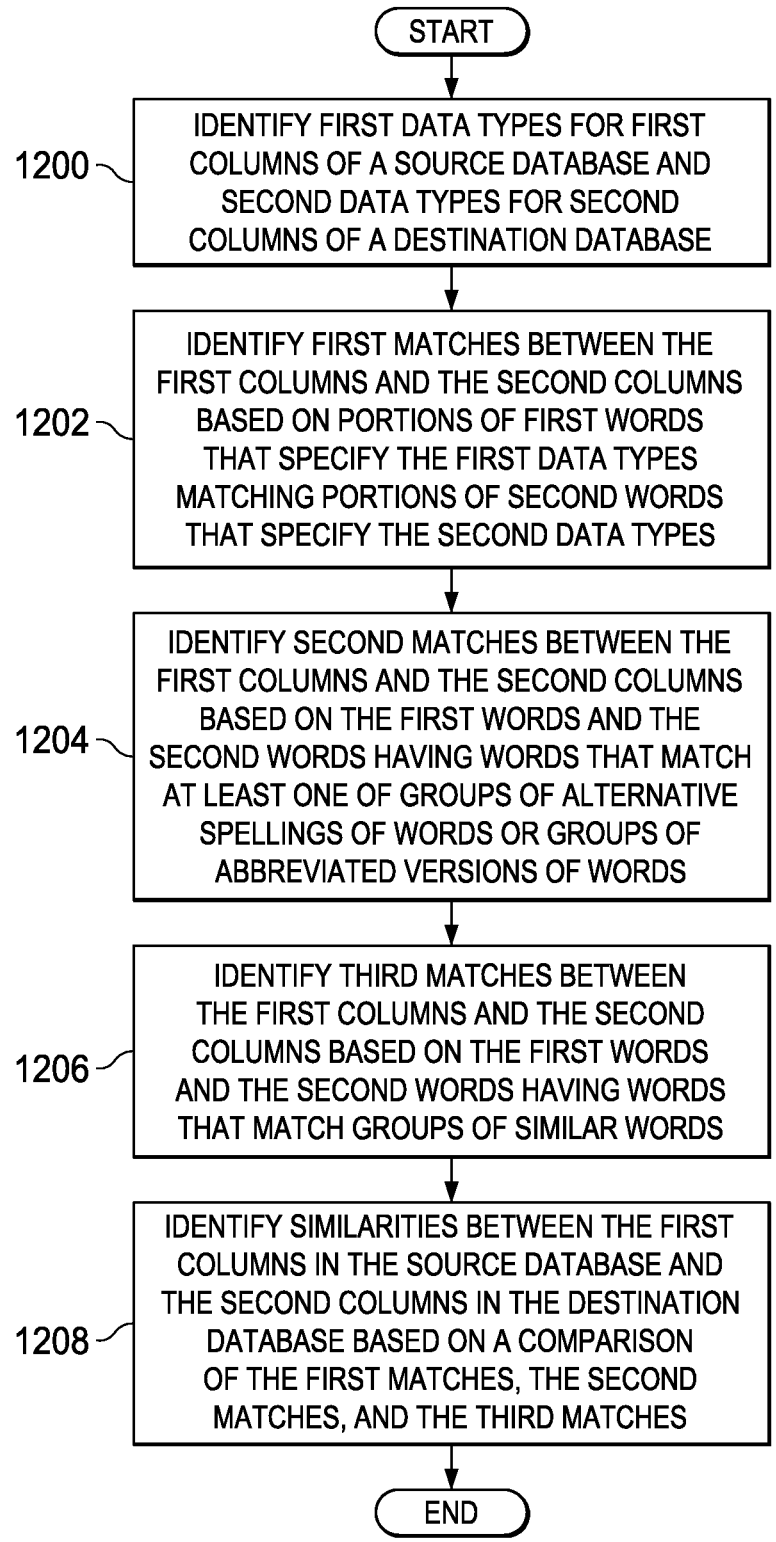
FIG. 12 is an illustration of a high level flowchart of a process for identifying similarities between columns based on compatible data types in accordance with an illustrative embodiment.

With reference now to FIG. 12, an illustration of a high level flowchart of a process for identifying similarities between columns based on compatible data types is depicted in accordance with an illustrative embodiment. The process illustrated in FIG. 12 is an example of an implementation of step 1004 in FIG. 10. The process may be implemented in information environment 100 in FIG. 1. More particularly, the process may be implemented in migrator 116 in FIG. 1 to migrate data 104 from first employee information system 102 to second employee information system 112.

The process begins by identifying first data types for first columns of a source database and second data types for second columns of a destination database (step 1200). The process identifies first matches between the first columns and the second columns based on portions of first words that specify the first data types matching portions of second words that specify the second data types (step 1202). The process next identifies second matches between the first columns and the second columns based on the first words and the second words having words that match at least one of groups of alternative spellings of words or groups of abbreviated versions of words (step 1204).

As depicted, the process further identifies third matches between the first columns and the second columns based on the first words and the second words having words that match groups of similar words (step 1206). The process then identifies similarities between the first columns in the source database and the second columns in the destination database based on a comparison of the first matches, the second matches, and the third matches (step 1208) with the process terminating thereafter.

Figure 13:
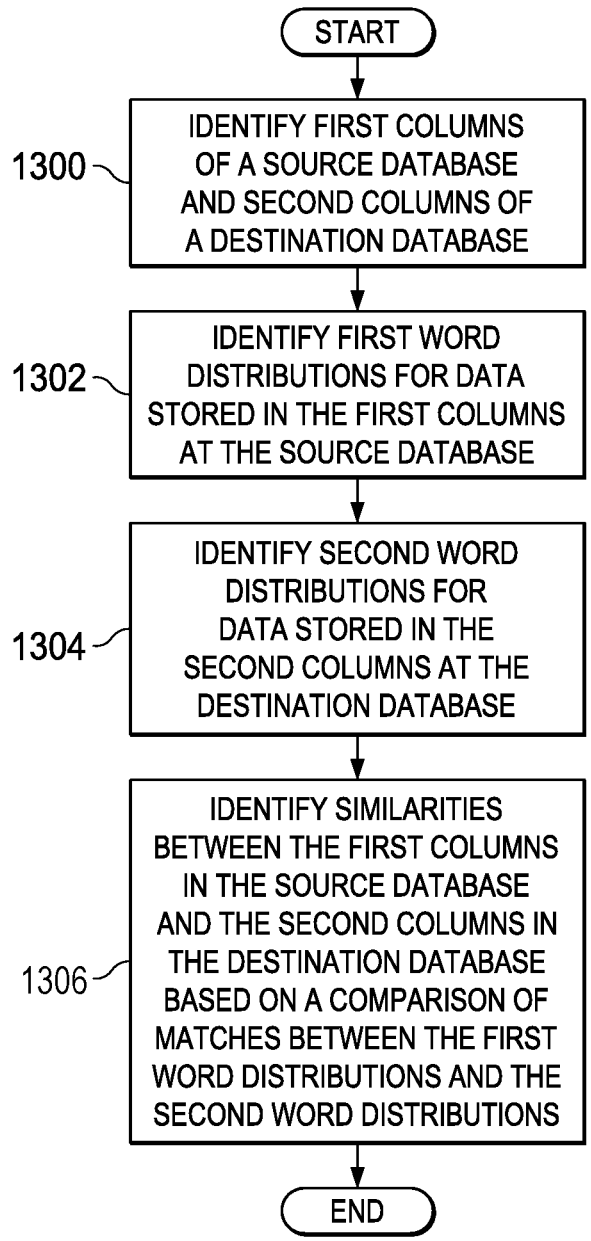
FIG. 13 is an illustration of a high level flowchart of a process for identifying similarities between columns based on data distributions in accordance with an illustrative embodiment.

With reference now to FIG. 13, an illustration of a high level flowchart of a process for identifying similarities between columns based on data distributions is depicted in accordance with an illustrative embodiment. The process illustrated in FIG. 13 is an example of an implementation of step 1006 in FIG. 10. The process may be implemented in information environment 100 in FIG. 1. More particularly, the process may be implemented in migrator 116 in FIG. 1 to migrate data 104 from first employee information system 102 to second employee information system 112.

The process begins by identifying first columns of a source database and second columns of a destination database (step 1300). The process identifies first word distributions for data stored in the first columns at the source database (step 1302). The process next identifies second word distributions for data stored in the second columns at the destination database (step 1304). The process then identifies similarities between the first columns in the source database and the second columns in the destination database based on a comparison of matches between the first word distributions and the second word distributions (step 1306) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more steps in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, step 1006 may be omitted. The column names and data types may be used without the data distributions to identify similarities between the first columns in the source database and the second columns in the destination database. As another example, column names and data types may be used when step 1004 is omitted.

Figure 14:
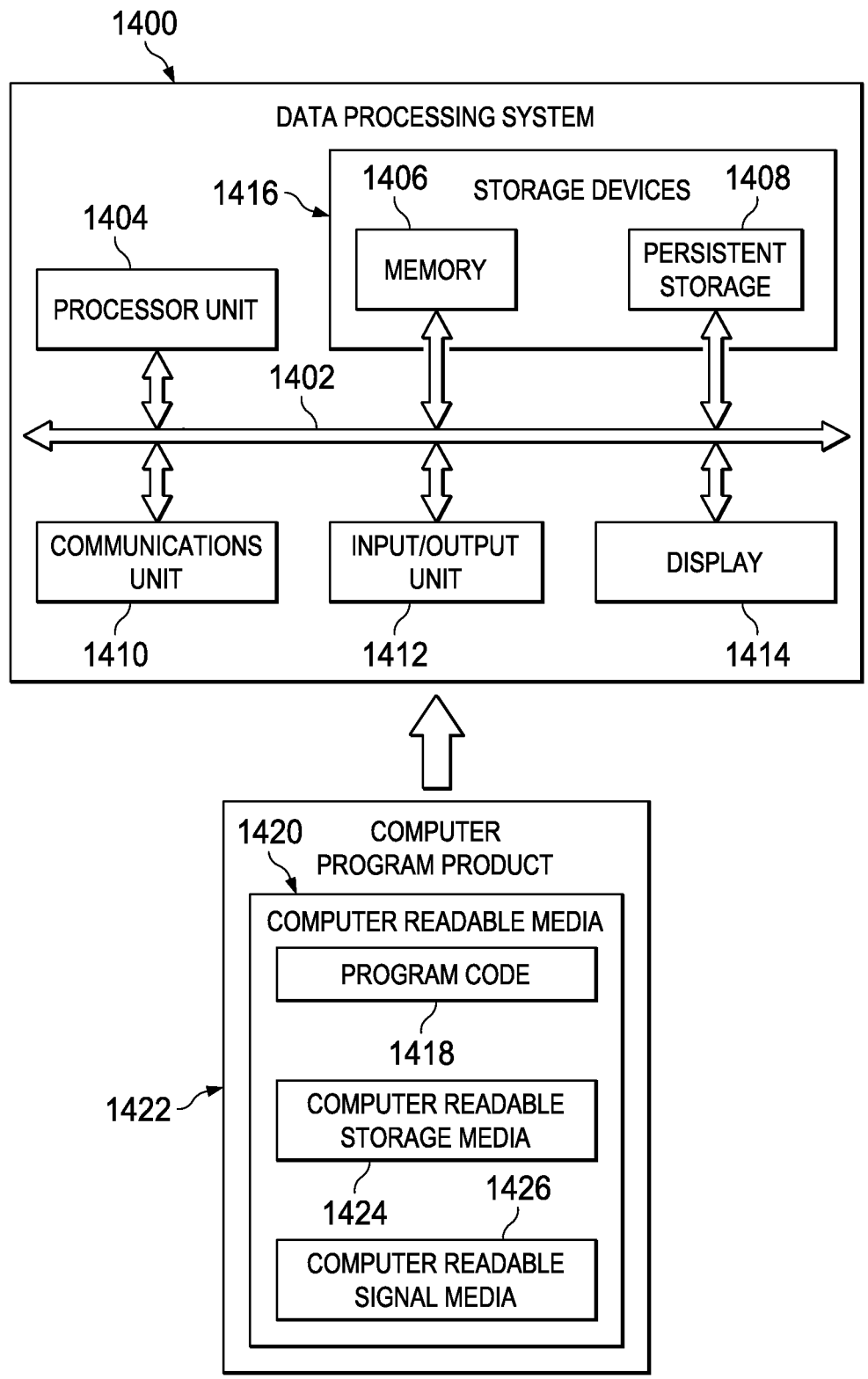
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be used to implement one or more data processing systems in computer system 118 in FIG. 1. In this illustrative example, data processing system 1400 includes communications framework 1402, which provides communications between processor unit 1404, memory 1406, persistent storage 1408, communications unit 1410, input/output (I/O) unit 1412, and display 1414. In this example, communication framework may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426. In these illustrative examples, computer readable storage media 1424 is a physical or tangible storage device used to store program code 1418 rather than a medium that propagates or transmits program code 1418.

Alternatively, program code 1418 may be transferred to data processing system 1400 using computer readable signal media 1426. Computer readable signal media 1426 may be, for example, a propagated data signal containing program code 1418. For example, computer readable signal media 1426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code 1418.

The description of the different illustrative embodiments has been presented for purposes of illustration and description and is not intended to be exhaustive or limited to the embodiments in the form disclosed. The different illustrative examples describe components that perform actions or steps. In an illustrative embodiment, a component may be configured to perform the action or step described. For example, the component may have a configuration or design for a structure that provides the component an ability to perform the action or step that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for migrating data, the method comprising:
a computer system:
locating information about a structure used to store the data in a source database;
identifying similarity weights between different combinations of a first plurality of first columns compared to different combinations of a second plurality of second columns, wherein the first plurality of first columns are in the source database, and the second plurality of second columns are in a destination database, wherein similarity weights are identified based on:
  similar column names between the first plurality of first columns and the second plurality of second columns;
  compatible data types between the first plurality of first columns and the second plurality of second columns; and
  similar data distributions in the information of the first plurality of first columns and the second plurality of second columns;
identifying sets of suggestions for matches between the first plurality of first columns in the source database and the second plurality of second columns in the destination database by calculating a sum of the similarity weights for each of the different combinations of the first plurality of first columns and the second plurality of second columns;
displaying suggestions for matches between the first plurality of first columns in the source database and the second plurality of second columns in the destination database on a display system based on the set of suggestions having a largest sum of the similarity weights between the first plurality of first columns and the second plurality of second columns;
receiving user input to the suggestions, enabling reaching a desired level of matching to migrate the data from the source database to the destination database; and
migrating the data from the source database to the destination database using the desired level of matching between the first plurality of first columns and the second plurality of second columns.

2. The method of claim 1 further comprising the computer system:
  repeating the identifying, displaying and receiving steps until the desired level of matching between the first plurality of first columns and the second plurality of second columns is present.

3. The method of claim 1, wherein similarities are identified from groups of similar words for the column names.

4. The method of claim 3, wherein a group of similar words in the groups of similar words is modified using the user input.

5. The method of claim 1, wherein identifying similarities between first column names in the information in the source database and second column names in the destination database based on the compatible data types comprises:
  identifying first portions of the first column names matching second portions of the second column names.

6. The method of claim 5, wherein a first portion in the first portions that matches a second portion in the second portions is selected from at least one of a word, a phrase, an abbreviation of a word, a synonym, a spelling variation, a phrase, a translation to another language, or a syllable.

7. The method of claim 1, wherein the data is first data, and wherein the identifying sets of suggestions comprises:
  identifying matches between a first portion of the first data stored in the first plurality of first columns and a second portion of second data stored in the second plurality of second columns.

8. The method of claim 1, wherein the locating, identifying, displaying and receiving steps are performed for a group of databases in addition to the source database.

9. The method of claim 8, wherein the information about the structure is a database schema.

10. A computer system comprising:
  a group of hardware processors;
  a display system in communication with the group of hardware processors; and
  a migrator implemented by the group of hardware processors, wherein the migrator:
    locates information about a structure used to store data in a source database;
    identifies similarity weights between different combinations of a first plurality of first columns compared to different combinations of a second plurality of second columns, wherein the first plurality of are in the source database, and the second plurality of second columns are in a destination database, wherein the similarity weights are identified based on similar column names between the first plurality of first columns and the second plurality of second columns, compatible data types between the first plurality of first columns and the second plurality of second columns, and similar data distributions in the information of the first plurality of first columns and the second plurality of second columns;
    identifies sets of suggestions for matches between the first plurality of first columns in the source database and the second plurality of in the destination database by calculating a sum of the similarity weights for each of the different combinations of the first plurality of first columns and the second plurality of second columns;
    displays suggestions for matches between the first plurality of first columns in the source database and the second plurality of second columns in the destination database on a display system based on the set of suggestions having a largest sum of the similarity weights between the first plurality of first columns and the second plurality of second columns;
    receives user input to the sets of suggestions, enabling reaching a desired level of matching to migrate data from the source database to the destination database; and
    migrates the data from the source database to the destination database using the desired level of matching between the first plurality of first columns and the second plurality of second columns.

11. The computer system of claim 10, wherein the migrator repeats:
  identifying similarities between the first plurality of first columns in the source database and the second plurality of second columns in the destination database based on the column names and the compatible data types in the information; displaying suggestions for matches between the first plurality of first columns in the source database and the second plurality of second columns in the destination database on the display system based on the similarities identified; and receiving the user input to the sets of suggestions until the desired level of matching between the first plurality of first columns and second plurality of second columns is present.

12. The computer system of claim 10, wherein similarities are identified from groups of similar words for the column names.

13. The computer system of claim 12, wherein a group of similar words in the groups of similar words is modified using the user input.

14. The computer system of claim 10, wherein in identifying similarities between first column names in the information in the source database and second column names in the destination database based on the compatible data types, the migrator identifies first portions of first column names matching second portions of the second column names.

15. The computer system of claim 14, wherein a first portion in the first portions that matches a second portion in the second portions is selected from at least one of a word, a phrase, an abbreviation of a word, a synonym, a spelling variation, a phrase, a translation to another language, or a syllable.

16. A computer program product comprising:
a computer readable storage media including instructions for migrating data, the instructions comprising:
first program code for locating information about a structure used to store the data in a source database;
second program code for identifying similarity weights between different combinations of a first plurality of first columns compared to different combinations of a second plurality of second columns, wherein the first plurality of first columns are in the source database, and the second plurality of second columns are in a destination database, wherein the similarity weights are identified based on similar column names between the first plurality of first columns and the second plurality of second columns, compatible data types between the first plurality of first columns and the second plurality of second columns, and similar data distributions in the information of the first plurality of first columns and the second plurality of second columns;
third program code for identifying sets of suggestions for matches between the first plurality of first columns in the source database and the second plurality of second columns in the destination database by calculating a sum of the similarity weights for each of the different combinations of the first plurality of first columns and the second plurality of second columns;
fourth program code for displaying suggestions for matches between the first plurality of first columns in the source database and the second plurality of second columns in the destination database on a display system based on the set of suggestions having a largest sum of the similarity weights between the first plurality of first columns and the second plurality of second columns;
fifth program code for receiving user input to the suggestions, enabling reaching a desired level of matching to migrate the data from the source database to the destination database; and
sixth program code for migrating the data from the source database to the destination database using the desired level of matching between the first plurality of first columns and the second plurality of second columns.

17. The computer system of claim 10, wherein the migrator operates on a group of databases in addition to the source database.

18. The computer system of claim 17, wherein the information about the structure is a database schema.

19. The computer program product of claim 16, wherein the instructions operate on a group of databases in addition to the source database.

20. The computer program product of claim 19, wherein the information about the structure is a database schema.

* * * * *